UNITED STATES PATENT OFFICE.

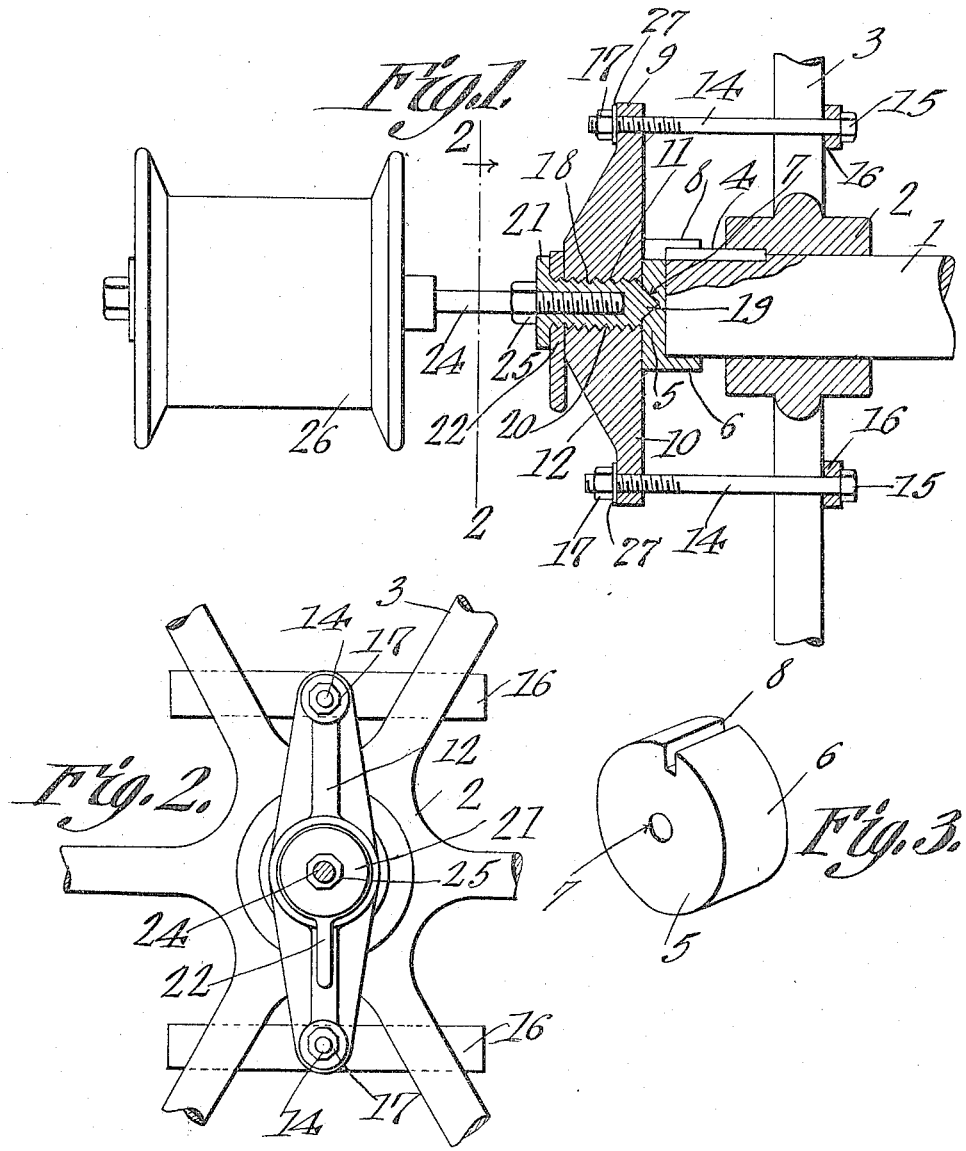

WESLIE M. ROADES, OF OKMULGEE, OKLAHOMA, ASSIGNOR TO UNITED IRON WORKS COMPANY, OF OKMULGEE, OKLAHOMA.

MEASURING-LINE-REEL CLAMP.

1,193,188.     Specification of Letters Patent.     Patented Aug. 1, 1916.

Application filed April 10, 1914, Serial No. 831,040. Renewed June 5, 1916. Serial No. 101,872.

*To all whom it may concern:*

Be it known that I, WESLIE M. ROADES, a citizen of the United States, residing at Okmulgee, in the county of Okmulgee and State of Oklahoma, have invented a new and useful Measuring-Line-Reel Clamp, of which the following is a specification.

The device forming the subject matter of this application is a reel support adapted to be connected to the shaft of an engine and adapted, primarily to be employed for winding measuring lines, torpedo lines and the like which are used in connection with oil well operations.

One object of the present invention is to provide a means whereby the centering element which coöperates with the shaft of the engine may be held in a fixed position, so that no adjustments of the centering device are necessary after the same has once been fixed properly to coöperate with the shaft of any given engine.

Another object of the invention is to provide, in a device of the type described, a single element which constitutes at once, a support for the reel shaft and a centering element.

The invention aims to provide a novel means whereby the structure may be centered properly, even though the end of the engine shaft be somewhat battered or marred.

Another object of the invention is to provide a supporting yoke in a device of the class described, the construction of the yoke being such that all necessary adjustments attendant upon its use may be carried out from one side of the wheel wherewith the yoke is assembled.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing: Figure 1 shows the invention in side elevation, parts being broken away; Fig. 2 is a section on the line 2—2 of Fig. 1; Fig. 3 is a perspective of the shaft-cap.

In the accompanying drawings the numeral 1 indicates the shaft of an engine, there being a wheel shown in the drawings, the same comprising a hub 2 and spokes 3, the hub 2 being held to the shaft 1 by means of a key 4. Applied to the end of the shaft 1 is a cap 5 having a flange 6 which surrounds the shaft, the cap 5 being equipped with a center recess 7.

In practice it is found that the engine shafts are always more or less battered or marred upon their exposed ends. The operation of centering the supporting yoke hereinafter described cannot be carried out with accuracy if the shaft is battered or marred upon its end, and therefore the function of the cap 5 will be evident when the nature of the invention is better understood. In order to permit the cap 5 to be mounted properly on the end of the shaft 1, the cap is provided with an opening 8 which is adapted to receive the key 4.

The invention includes a yoke denoted generally by the numeral 9 and this yoke is a composite structure, the same including a cross bar 10 provided with a projecting socket 11 reinforced by wings or webs 12 extended longitudinally of the cross bar. Mounted to move transversely of the cross bar 10 and held for sliding movement therein are clamping elements which may be bolts 14, the heads 15 of the bolts 14 passing between the spokes 3 of the wheel on the engine shaft and engaging cleats 16, the cleats being loose upon the bolts and being adapted to engage the inner faces of the spokes 3 as will be understood readily from Figs. 1 and 2. Threaded onto the outer ends of the bolts 14 are nuts 17 engaging washers 27 which bear against the cross bar 10. By turning the nuts 17, the cleats 16 may be made to coöperate with the spokes 3.

The invention includes a centering device preferably taking the form of a tubular screw 18 provided with a centering projection 19 adapted to coöperate with the centering recess 7 in the cap 5. The screw 18 is externally threaded as shown at 20 to fit in the socket 11 and is provided with a milled head 21 or its equivalent whereby the screw may be turned. Threaded onto the tubular centering element 18 is a lever nut 22 which is adapted to bear against the end of the socket 7. The tubular screw 18 is internally threaded to receive a shaft 24 held in place by a lock nut 25 and supporting a reel 26. By rotating the screw 18, the centering projection 19 thereof, may be made to coöperate with the recess 7 of the cap 5 and then the screw may be held in place by rotating the lever nut 22 until the same bears against the end of the socket 11. In order to detach the yoke 8 from the wheel, the nuts 17 may be loosened, and it is to be observed that after the centering screw 18 has once been adjusted so as to coöperate with any particular shaft, no change in the position of the screw need be made when the yoke is detached from the wheel upon the shaft. The structure, therefore, always remains in condition to coöperate with any given shaft after having once been adjusted thereto. The function of the lever nut 22 is of importance, since, so far as I am advised as to the state of the art, no one hitherto has proposed to provide a locking means which engages, at once, immediately with the particular element which coöperates with the shaft to center the yoke, and engages also with the yoke.

It is to be observed that all necessary adjustments may be made from the same side of the fly wheel and that it is unnecessary to reach through the fly wheel to make the adjustments, the nuts 17, the screw 18 and the lever nut 22 all lying upon the same side of the wheel.

Having thus described the invention, what is claimed is:—

1. In a device of the class described, a cap having a centering element, the cap being provided with shaft engaging means for maintaining the centering element in the axis of rotation of the cap when the cap is in shaft-engaged position; a wheel-engaging yoke; a member adjustable in the yoke and coöperating with the centering element; and a reel for which the yoke constitutes a support.

2. In a device of the class described, a wheel-engaging yoke; a tubular centering element threaded in the yoke and having a turning head; a reel; a shaft supporting the reel and threaded into the centering element; a lock nut on the centering element and engaging the yoke; and a lock nut on the shaft and engaging the centering element.

In testimony that I claim the foregoing as my own, I have hereto affixed my signature in the presence of two witnesses.

WESLIE M. ROADES.

Witnesses:
F. H. COTT,
L. A. VOORHEES.

Copies of this patent may be obtained for five cents each, by addressing the "Commissioner of Patents, Washington, D. C."